United States Patent Office 2,719,778
Patented Oct. 4, 1955

2,719,778
PRODUCTION OF HYDROXYLAMINE

Kurt Jockers, Neckarhausen, and Karl Wintersberger, Ludwigshafen (Rhine), Germany, assignors to Badische Anilin- & Soda-Fabrik Aktiengesellschaft, Ludwigshafen (Rhine), Germany No Drawing. Application August 12, 1952,
Serial No. 304,014

Claims priority, application Germany September 18, 1951

4 Claims. (Cl. 23—190)

This invention relates to a new and improved method of producing hydroxylamine.

It is already known that nitric oxide can be reduced to hydroxylamine with hydrogen in the presence of catalysts, in particular platinum, in an acid medium. An economical production of hydroxylamine by this method has not hitherto been possible, because the speed of reaction is too small and therefore only small yields per unit of time and space are obtained.

In our application Serial Number 313,586, filed October 7, 1952, we have described the production of hydroxylamine by catalytic reduction of nitric oxide with hydrogen in an acid medium under increased pressure. In our application Serial Number 313,587, filed October 7, 1952, now abandoned, we proposed to carry out this reaction at elevated temperatures.

We have now found that considerably better space-time yields are obtained by carrying out the reduction in the presence of organic compounds having in the molecule polar groups and a medium number of carbon atoms, preferably from 4 to 10 carbon atoms.

Oxygen-containing compounds of this kind have proved especially suitable, in particular non-branched or branched aliphatic or hydroaromatic alcohols, if desired having a side chain, and also aliphatic or hydroaromatic acids, aliphatic or hydroaromatic oximes or the ketones on which these oximes are based, the latter especially when their hydrogenation or oximation products themselves have an accelerating effect on the reaction. Esters and ethers and heterocyclic compounds, as for example tetrahydrofurane, are also suitable.

The amount which it is necessary to add depends on the compound used. Additions of 0.2 to 1.0 gram per litre of reaction liquid are usually sufficient.

The following example will further illustrate this invention, but the invention is not restricted to this example.

Example

A mixture of 1 volume of nitric oxide and 2 volumes of hydrogen is led into a suspension of a platinum catalyst in 3-normal hydrochloric acid at room temperature while stirring. A yield of hydroxylamine of about 70 per cent, with reference to the nitric oxide used, is obtained; the space-time yield is 5.5 grams of hydroxylamine per litre per hour.

If 500 milligrams of cyclohexanol be added to each litre of the hydrochloric acid and the treatment be carried out under otherwise identical conditions, the yield of hydroxylamine is again 70 per cent, with reference to the nitric oxide used, but the amount of gas to be reacted per unit of time can be so increased that the space-time yield is increased to 12.5 grams of hydroxylamine per litre per hour, i. e. to 2.3 times the space-time yield obtained without the addition of cyclohexanol.

The following table gives the factors for the acceleration of the reaction (relation between the speed of reaction with the additional substance and the speed of reaction without the additional substance) for other additional substances used in the same amount and under the same conditions:

| Substance added: | Acceleration factor |
|---|---|
| Amyl alcohol (mixture of isomers) | 1.9 |
| Isovaleric acid | 2.0 |
| Hexahydrobenzoic acid | 2.1 |
| Dioxane | 1.4 |
| Cyclohexanone oxime | 2.2 |

What we claim is:

1. A process for the production of hydroxylamine by catalytic reduction of nitric oxide with hydrogen in an acid medium, which comprises carrying out the reduction in the presence of about 0.2 to 1 gram per liter of reaction liquid of an organic compound having from 4 to 10 carbon atoms in the molecule and selected from the group consisting of aliphatic and hydroaromatic alcohols, acids, ketones and oximes thereof.

2. A process for the production of hydroxylamine by catalytic reduction of nitric oxide with hydrogen in an acid medium, which comprises carrying out the reduction in the presence of about 0.2 to 1 gram per liter of reaction liquid of cyclohexanol.

3. A process for the production of hydroxylamine by catalytic reduction of nitric oxide with hydrogen in an acid medium, which comprises carrying out the reduction in the presence of about 0.2 to 1 gram per liter of reaction liquid of cyclohexanone oxime.

4. A process for the production of hydroxylamine by catalytic reduction of nitric oxide with hydrogen in an acid medium, which comprises carrying out the reduction in the presence of about 0.2 to 1 gram per liter of reaction liquid of hexahydrobenzoic acid.

References Cited in the file of this patent

UNITED STATES PATENTS

| 2,113,812 | Lippincott | Apr. 12, 1938 |
| 2,146,060 | Ellis | Feb. 7, 1939 |
| 2,307,929 | Joyce | Jan. 12, 1943 |
| 2,414,142 | Dreyfus | Jan. 14, 1947 |
| 2,628,889 | Benson | Feb. 17, 1953 |

OTHER REFERENCES

J. W. Mellor's "Modern Inorganic Chem.," single vol. ed., new impression of 8th ed., January 1935, page 665, Longmans, Green and Co., N. Y.

J. W. Mellor's "A Comprehensive Treatise on Inorganic and Theoretical Chem.," vol. 8, pages 281, 290, 296, Longmans, Green and Co., N. Y.

Karrer's "Organic Chem.," 1946 ed., page 153, Elsevier Publ. Co. Inc., New York.